(12) United States Patent
Li et al.

(10) Patent No.: US 8,578,202 B2
(45) Date of Patent: Nov. 5, 2013

(54) SYSTEM AND METHOD FOR PROVIDING HIGH AVAILABILITY FOR DISTRIBUTED APPLICATION

(75) Inventors: Guodong Li, Beijing (CN); Hailin Peng, Beijing (CN); Zhenghua Xu, Beijing (CN); Ran Shuai, Beijing (CN)

(73) Assignee: CA, Inc., Islandia, NY (US)

( * ) Notice: Subject to any disclaimer, the term of this patent is extended or adjusted under 35 U.S.C. 154(b) by 520 days.

(21) Appl. No.: 12/846,056

(22) Filed: Jul. 29, 2010

(65) Prior Publication Data

US 2012/0030503 A1 Feb. 2, 2012

(51) Int. Cl.
*G06F 11/00* (2006.01)

(52) U.S. Cl.
USPC ............ 714/4.11; 714/3; 714/4.1; 709/203; 709/219; 709/223

(58) Field of Classification Search
USPC ........... 714/3, 4, 4.1, 4.11; 709/203, 219, 223
See application file for complete search history.

(56) References Cited

U.S. PATENT DOCUMENTS

| | | | |
|---|---|---|---|
| 5,465,251 A * | 11/1995 | Judd et al. | 370/351 |
| 6,202,149 B1 * | 3/2001 | Hedegard | 713/100 |
| 7,055,053 B2 * | 5/2006 | Saika | 714/4.11 |
| 7,275,100 B2 * | 9/2007 | Yamagami | 709/224 |
| 2003/0158869 A1 * | 8/2003 | Micka | 707/203 |
| 2003/0225760 A1 * | 12/2003 | Ruuth et al. | 707/5 |
| 2006/0101474 A1 * | 5/2006 | Magown | 719/315 |
| 2006/0129608 A1 * | 6/2006 | Sato et al. | 707/200 |
| 2007/0168500 A1 * | 7/2007 | D'Souza et al. | 709/224 |
| 2008/0126832 A1 * | 5/2008 | Morosan et al. | 714/4 |
| 2009/0113233 A1 * | 4/2009 | Phan | 714/4 |
| 2010/0268687 A1 * | 10/2010 | Zembutsu | 707/634 |
| 2011/0310773 A1 * | 12/2011 | Iyengar et al. | 370/259 |

OTHER PUBLICATIONS

Hwang "High-Availability Algorithms for distributed stream processing" 2005, IEEE, p. 1-12.*

* cited by examiner

*Primary Examiner* — Joshua P Lottich
*Assistant Examiner* — Jeison C Arcos
(74) *Attorney, Agent, or Firm* — Myers Bigel Sibley & Sajovec, P.A.

(57) ABSTRACT

A system and method is provided for ensuring high availability for a distributed application. A management object manages multiple scenarios defined for protection units associated with a distributed application. The management object may coordinate various operations performed at the protection units based on management object configuration information.

20 Claims, 7 Drawing Sheets

| Property | Value |
|---|---|
| ⊟ General | |
| ⊟ Scenario Dependencies | |
|   ⊟ Scenario [FileServer 2] | |
|     Depends on Scenario | [Select Scenario] |
|   ⊟ Scenario [Exchange] | |
|     Depends on Scenario | [Select Scenario] |
| ⊟ Switchover Settings | |
|   ⊟ Switchover as a Group | On |
|     ⊟ Failure Triggers Group Switchover | |
|       Scenario [FileServer 2] | On |
|       Scenario [Exchange] | On |
|     ⊟ Actions When Unable to Switchover as a Group | |
|       Execute the Scenario Switchover Settings | On |
| ⊟ Scenario Availability Sets | |

The scenarios in the same 'Scenario Availability Set' provide some kind of funcionality avaialbility. When one scenario fails, it will not trigger group switchover in case there are still other available

FIG. 5

SYSTEM AND METHOD FOR PROVIDING HIGH AVAILABILITY FOR DISTRIBUTED APPLICATION

TECHNICAL FIELD

The invention relates to the field of high availability systems and products. More particularly, the invention relates to high availability systems and products for distributed applications.

BACKGROUND

High availability (HA) is a system design protocol and associated implementation that ensures a high level of operational continuity (of a system, application, service, and/or associated data) during a given measurement period (which may be a year, a month, and/or any other measurement period). Availability may refer to the ability of the user community to access the system, whether to submit new work, update or alter existing work, or collect the results of previous work. If a user cannot access the system, it may be said to be unavailable. Generally, the term downtime may be used to refer to periods of system unavailability. Typically, downtime may be planned or unplanned.

A typical HA system for a specific application includes two servers, one of which is an active (production) server, and the other is a standby (replica) server. The application usually runs on the active server. When a planned downtime is triggered or an unplanned downtime event occurs at the active server indicating that the application will be unavailable, the HA system may bring up the application on the standby server to ensure continuous operation. For a planned downtime, this procedure may be referred to as switchover. For an unplanned downtime, this procedure may be referred to as failover. As such, high availability may refer to the system's ability to monitor the health of the active server and automatically failover/switchover (referred to generally as a "transfer") to the standby server and redirect end users during the planned/unplanned downtime.

More and more mission critical applications, for example, Microsoft SharePoint, BlackBerry, etc., are architecturally distributed today. Some high availability (HA) solutions partially support distributed applications by separately protecting all the distributed servers. However, there is a need for a HA solution that can effectively protect the whole distributed application, thereby significantly improving business continuity and reducing management cost.

These and other drawbacks exist.

SUMMARY

In some implementations, the invention relates to a system and method for ensuring/providing high availability for a distributed application. A management object manages multiple scenarios defined for protection units associated with a distributed application. The management object may coordinate various operations performed at the protection units based on management object configuration information.

Management object configuration information may be accessed to determine one or more relationships between one or more scenarios defined for the protection units. Relation type information (for example, failover/switchover together, run together, stop together, and/or other relation types) may also be determined from the management object configuration information. Based on the determined relationship/relation type information, the management object may coordinate one or more operations (for example, failover, switchover, run, stop, and/or other operations) performed at the protection units.

BRIEF DESCRIPTION OF THE DRAWINGS

The accompanying drawings, which are incorporated into and constitute a part of this specification, illustrate one or more examples of implementations of the invention and, together with the description, serve to explain various principles and aspects of the invention.

FIG. 5 depicts exemplary properties associated with a management object, according to various aspects of the invention.

Reference will now be made in detail to various implementations of the invention as illustrated in the accompanying drawings. The same reference indicators will be used throughout the drawings and the following description to refer to the same or like items.

DESCRIPTION OF EXEMPLARY IMPLEMENTATIONS

Figure 1:
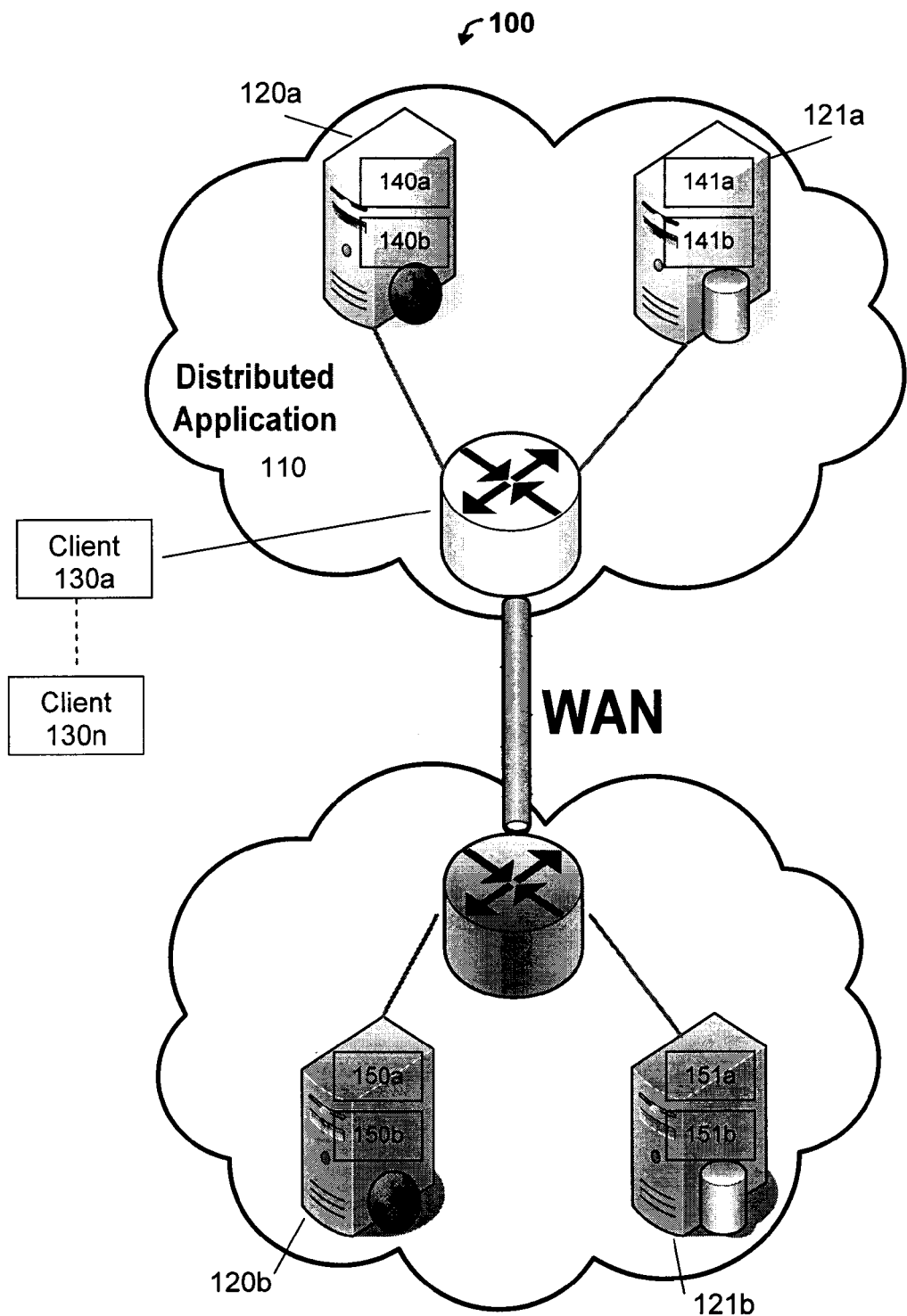
FIG. 1 illustrates an exemplary high availability system, according to various aspects of the invention.

FIG. 1 is an exemplary illustration of a high availability (HA) system 100 for protecting a distributed application against planned/unplanned downtime. HA system 100 for a distributed application may include at least two active servers, for example, active server 120a and active server 121a, and at least two standby servers, for example, standby server 120b and standby server 121b. Active servers 120a, 121a may be any physical or virtual servers that are configured to host/run one or more components of distributed application 110. For example, active server 120a may be a web server associated with the distributed application and active server 121a may be a database server associated with the distributed application. Active server 120a and active server 121a may transfer changes of application data as they occur to corresponding standby servers, for example, standby server 120b and standby server 121b. This ensures integrity of the replicated data, including emails, database updates, file operations and other content. Standby server 120b and standby server 121b may be located nearby on the same subnet or at any distance over a WAN (wide area network) or other network communication link. The standby servers may be normally passive, but may be available to take over the function of the corresponding active servers in the event of planned/unplanned downtime.

Each active server 120a, 121a and standby server 120b, 121b may include a processor (140a, 141a, 150a, and 151a, respectively), circuitry and/or other hardware operable to execute computer-readable instructions. According to one aspect of the invention, HA system 100/servers 120a, 121a, 120b, 121b may include one or more tangible computer-readable storage media configured to store one or more software agents/modules, wherein the software agents/modules include computer-readable instructions that when executed by the processor cause the processor to perform the functions described herein. According to one implementation, active servers 120*a*, 121*a* and standby servers 120*b*, 121*b* may comprise computer hardware programmed with a computer application having one or more software agents/modules 140*b*, 141*b*, 150*b*, 151*b* that enable the various features and functions of the invention.

Each active server/standby server pair (for example, active server 120*a*/standby server 120*b*, and active server 121*a*/standby server 121*b*) may be referred to as a protection unit/atom. In the event of planned/unplanned downtime associated with an active server in a protection unit, the corresponding standby server in the protection unit may take over the functioning of the active server. In one implementation, one or more software agents 150*b*/151*b* running on standby server 120*b*/121*b* may request one or more software agents 140*b*/141*b* running on active server 120*a*/121*a* to continuously monitor the state of the active server. The agents 140*b*/141*b* may check both the accessibility of the active server 120*a*/121*a* and the state of the application/component of the application running on the active server 120*a*/121*a* and in order to ensure that all necessary application services are running and the application data registers as valid. When the agents 150*b*/151*b* can't connect to agents 140*b*/141*b* or agents 140*b*/141*b* detect a problem with the active server 120*a*/121*a*, the system administrator may be alerted. The agents 150*b*/151*b* may send alerts via the GUI (graphical user interface) event window associated with client 130*a* (for example), email, system logs or other means. If a determination is made that the standby server 120*b*/121*b* must take over servicing end users, a fully automated transparent failover may be triggered automatically or manually by the administrator. In either case, once the failover is triggered, the application/component of the application on the standby server 120*b*/121*b* may be initiated by one or more software agents 150*b*/151*b* running on the standby server 120*b*/121*b* and all the necessary actions to redirect users to the standby server 120*b*/121*b* may be performed. Once the active server 120*a*/121*a* is back up and running, the application may be similarly switched back to the active server 120*a*/121*a*.

System administrators (or other users) may interact with the HA system 100 via one or more client devices 130*a*, ... , 130*n*. Client devices 130*a*, ... , 130*n* may each comprise a user interface (not shown) that may enable users to perform various operations that may facilitate interaction with HA system 100 including, for example, defining scenario configuration and/or scenario operation information, defining management object configuration and/or management object operation information, triggering one or more management object operations (for example, failover, switchover, etc.) and/or performing other operations. Client devices 130*a*, ... , 130*n* may include a processor (not shown), circuitry, and/or other hardware operable to execute computer-readable instructions.

A scenario may be defined for and used to describe each protection unit/atom. In other words, HA system 100 for a distributed application may include at least two protection units/atoms and at least two scenarios defined for the protection units/atoms. Each scenario may define one or more configuration parameters that may be used to protect the distributed application and ensure high availability of the system 100 and/or the distributed application 110.

Each scenario may include/define configuration information, serial scenario operation information, and/or other information, associated with the corresponding protection unit/atom. For example, for the active server 120*a*/standby server 120*b* pair (i.e., protection unit/atom), a scenario may include configuration information associated with the active server 120*a* and standby server 120*b*. The scenario information may be stored at the active server 120*a* and/or the standby server 120*b*. In one implementation, a user/administrator may define the configuration information and/or operation information associated with each scenario via the GUI associated with client 130*a*. The configuration information may include, among other things, active server 120*a*'s machine information (for example, active server's IP address, active server's host name, active server's DNS record, and/or other machine information), standby server 120*b*'s machine information (for example, standby server's IP address, standby server's host name, standby server's DNS record, and/or other machine information), distributed application information (for example, version of application and/or component of application, storage location of application data, and/or other application information), replication parameters/properties, high availability parameters/properties, and/or other configuration information. Similarly, for the active server 121*a*/standby server 121*b* pair (i.e., protection unit/atom), a scenario may include configuration information associated with the active server 121*a* and standby server 121*b*. The scenario may be stored at the active server 121*a* and/or the standby server 121*b*.

Figure 2:
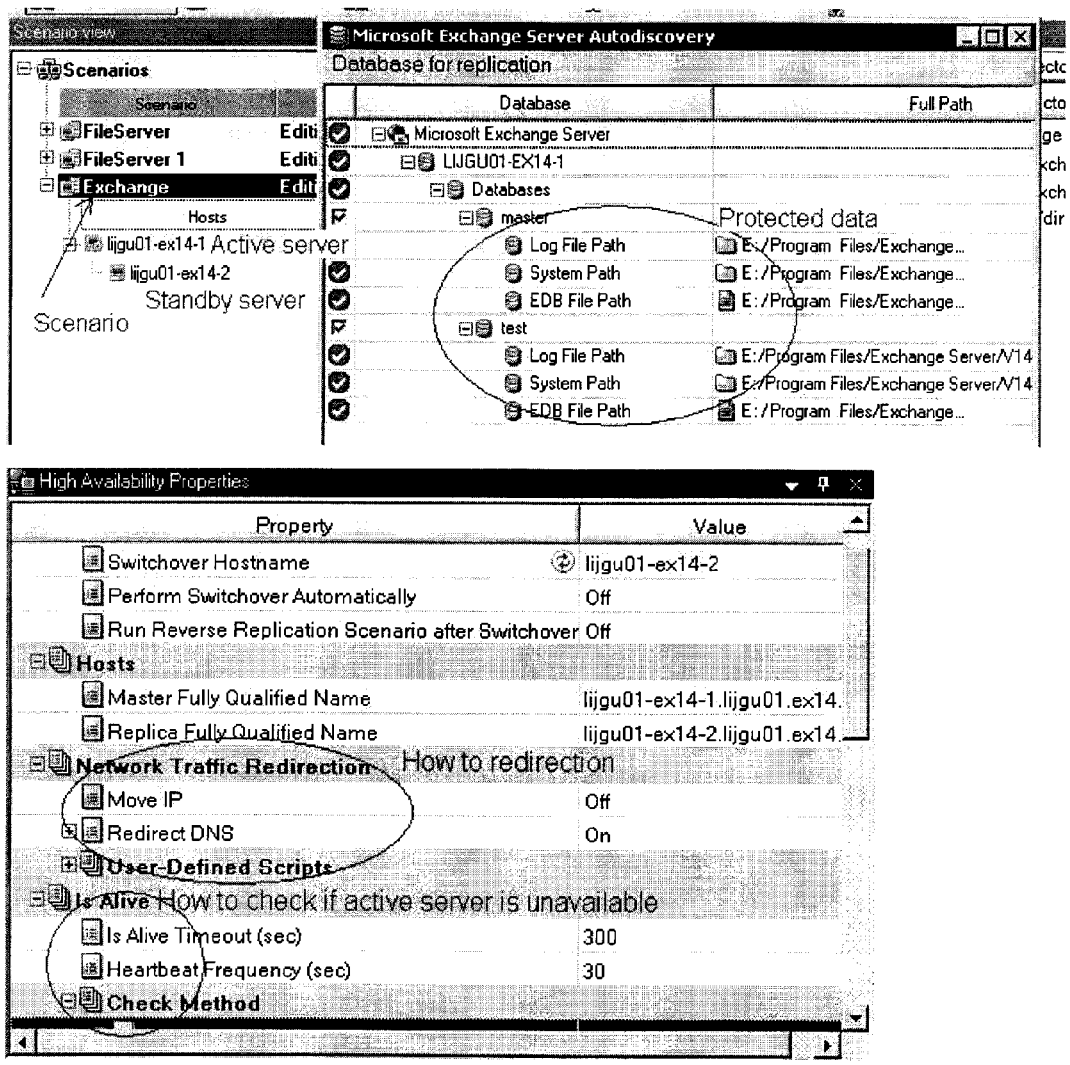
FIG. 2 illustrates exemplary replication and high availability properties included in a scenario, according to various aspects of the invention.

FIG. 2 illustrates exemplary replication and high availability properties included in a scenario (for example, a scenario defined for active server 121*a*/standby server 121*b* pair). For example, FIG. 2 depicts a scenario "Exchange" defined for active server "lijgu0'-ex14-1" and standby server "lijgu0'-ex14-2". It will be understood that the Exchange scenario depicted in FIG. 2 is a mere example of a scenario associated with active server 121*a*/standby server 121*b* pair. Other scenarios may exist depending on the type of distributed application being protected by the HA system without departing from the scope of the invention.

An active server's application data change may be replicated to a corresponding standby server. Replication properties may define the location where application data to be replicated is stored at active server 121*a*, for example. Replication properties may also define the location where the replicated application data is to be stored at standby server 121*b*, for example. When application data is changed at active server 121*a*, a software agent 141*b* running at the active server 121*a* may capture the change and store the changed application data at a location (memory location, disk location, etc.) at the active server 121*a*. Replication properties may define this location address/data as the location from where the application data is to be replicated to the standby server 121*b*. Replication properties may also define a location address at the standby server 121*b* as the location where the replicated application data from the active server 121*a* is to be stored at the standby server 121*b*. Software agent 141*b* may send the changed application data to standby server 121*b*. Software agent 151*b* may receive and store the application data at the defined location address at the standby server 121*b*.

Figure 3A:
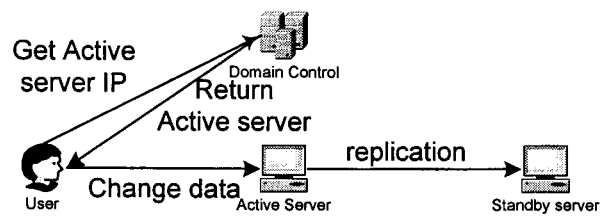
FIGS. 3a and 3b depict an exemplary redirection process, according to various aspects of the invention.
Figure 3B:
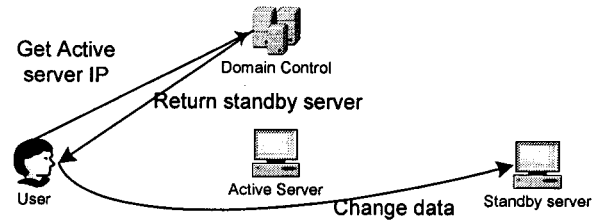

One or more high availability properties may define/include properties that enable continuity of the distributed application in case of planned/unplanned downtime. A high availability property may define a network redirection method to be used in the case of planned/unplanned downtime. When an active server 120*a*/121*a* is unavailable and/or the application/component of the application running on the active server 120*a*/121*a* is unavailable, the standby server 120*b*/121*b* should be active and an end user should be automatically re-directed to the standby server. In one implementation, if the high availability property indicates that the "Redirect DNS" method (Redirect Domain Name System method) is to be used for the re-direction process (which is depicted in FIG. 2 as Redirect DNS—"On"), an A-record associated with the active server may be changed in the domain controller such that it points to the standby server. FIGS. 3a and 3b depict the redirection process. For example, FIG. 3a depicts the case when an active server is available and the active server's DNS may be used to access the application. FIG. 3b depicts the case when the active server is unavailable and the active server's DNS may be redirected to point to the standby server in order to access the application. Other network redirection methods may be used and defined in the high availability properties without departing from the spirit of the invention.

In one implementation, the one or more high availability properties may define the method used to check if an active server is unavailable (for example, Is alive timeout, heartbeat frequency, and/or other methods), whether switchover/failover is to be done automatically or manually, a method used to notify administrator if switch/failover is to be done manually (e.g., via event, email, alert, and/or other notification method), and/or other properties.

In one implementation, one or more serial scenario operations that are to be performed by each active server/standby server pair to ensure continuous system/application operability may be determined based on the configuration information defined in the scenario associated with the pair. For example, based on the high availability properties, heartbeat frequency measurements may be used to determine that an active server is unavailable. In response to such a determination, the "Redirect DNS" method may be used to automatically failover to the standby server. Based on the replication properties, for example, the application change data may be replicated from a storage location at the active server to a storage location at the corresponding standby server.

One or more software agents (which may be referred to as scenario objects) running on each active server/standby server pair may perform the one or more serial scenario operations. For example, active server 120a may run scenario object 140b, standby server 120b may run scenario object 150b, active server 121a may run scenario object 141b, and standby server 121b may run scenario object 151b. The scenario objects in each active server/standby server pair communicate with each other to perform the various operations to ensure continuous system/application operability. In other words, a scenario associated with each active/standby server pair may include configuration information that may define which scenario operations are to be performed by the active server and which ones are to be performed by the standby server. For example, for the replication process, any changes to the application data at the active server 121a may be captured by scenario object 141b. Scenario object 141b may send the captured application data to scenario object 151b. Scenario object 151b may store the received application data at a defined storage location at standby server 121b. Similarly, scenario objects 141b and 151b may communicate with one another to perform one or more scenario operations associated with switchover/failover during planned/unplanned downtime. When failover/switchover from active server 121a to standby server 121b is triggered, scenario objects 141b and 151b may perform, among others, the following operations: i) scenario object 151b may notify scenario object 141b to stop service and release a network resource; ii) scenario object 141b may notify scenario object 151b upon completion of the tasks identified in operation i); and iii) scenario object 151b may gain the network resource and start service on standby server 121b. In one implementation, if active server 121a can't be accessed by standby server 121b, operations i) and ii) may be skipped.

For a distributed application, with at least two protection units and defined scenarios, the failover/switchover from active server to standby server in each protection unit may be coordinated to ensure continuous and proper functioning of the distributed system/application. Each scenario includes information associated with a corresponding protection unit and does not have knowledge about other protection units or relationship between the other protection units associated with a distributed application. However, for a distributed application, each scenario may depend on or have a relationship with one another. The scenarios may have one or more relations with one another, for example, "failover/switchover together", "run together", "stop together", and/or other relations. For example, a scenario defined for active server 121a/standby server 121b pair may depend on and may have a "failover/switchover together" relation with the scenario defined for active server 120a/standby server 120b. In this case, if the active server 120a and/or component of application running on active server 120a is unavailable, both the active server 120a and the active server 121a may failover/switchover to standby server 121b and standby server 121b, respectively. In one implementation, the scenarios may have a relationship such that failover/switchover from active server to standby server in each protection unit may need to be performed in a certain pre-defined order or sequence.

In one implementation, a manager software agent/module (referred to as a management object) may manage a plurality of scenarios associated with a distributed application and may determine and/or coordinate one or more operations to be performed by active server 120a/121a and/or standby server 120b/121b (i.e., performed at one or more protection units) based on the relationship between the scenarios. The management object may reside and run on each active server 120a/121a and standby server 120b/121b. In other words, each active server and standby server may have an instance of the management object running on them. Servers 120a, 121a, 120b, 121b may include one or more tangible computer-readable storage media configured to store one or more manager software agents/modules, wherein the manager software agents/modules include computer-readable instructions that when executed by the corresponding processors 140a, 141a, 150a, 151a cause the processors to perform the functions described herein.

Figure 4A:
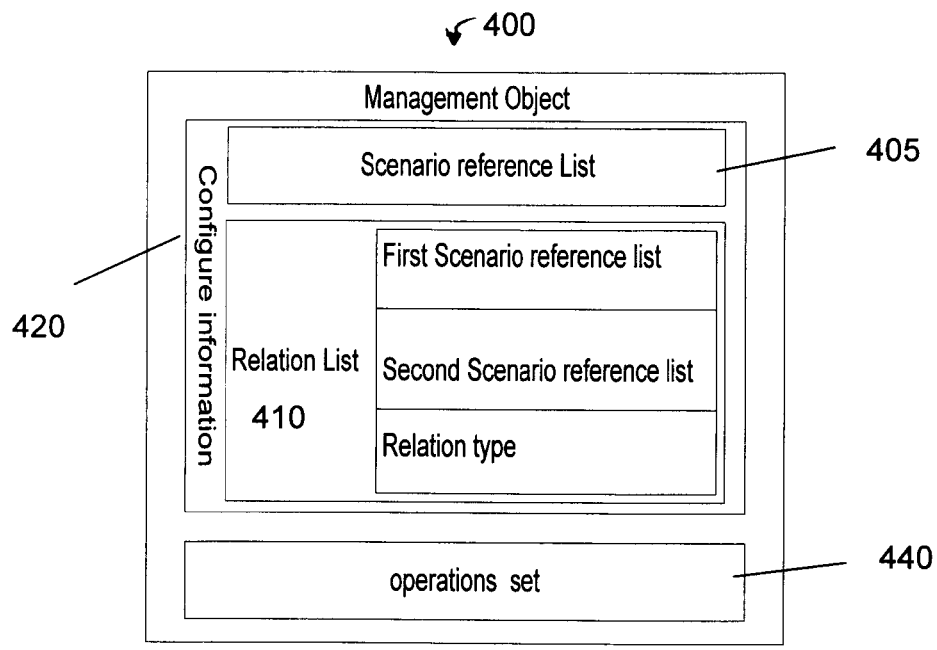
FIGS. 4a and 4b depict an exemplary management object, according to various aspects of the invention.

FIG. 4a depicts an exemplary management object 400 that may include/define management object configuration information 420, a set of one or more management operations 440, and/or other information. In one implementation, a user/administrator may define the management object configuration information 420 and/or management operation information 440 via the GUI associated with client 130a. The number of scenarios being managed by management object 400 may be stored in a scenario reference list 405. As described above, the scenario configuration information associated with a scenario may be stored in both the active server and standby server for which the scenario is defined. The scenario reference list 405 in the management object 400 may store a pointer/reference to the location where the scenario configuration information is stored, which may be a pointer to the active server and/or the standby server. If a particular scenario property has to be accessed, the scenario reference list 405 may be used to determine the pointer/reference to the scenario configuration information, which may be used to access the scenario configuration information stored at the active server and/or standby server. The management object configuration information 420 may include a relation list 410. The relation list 410 may store a list of scenarios that have a relation with and/or dependency on one another and the relation type. The relation list 410 may include a first scenario reference list, a second scenario reference list and relation type. Relation type may describe the type of relation/dependency between scenarios listed in the first scenario reference list and the second scenario reference list. For example, the first scenario reference list may include a reference/pointer to the location where the scenario configuration information associated with active server 120a and standby server 120b pair is stored, the second scenario reference list may include a reference/pointer to the location where the scenario configuration information associated with active server 121a and standby server 121b pair is stored, and the relation/dependency type may include "failover/switchover together" relation between the scenarios associated with the active server 120a/standby server 120b pair and active server 121a/standby server 121b pair respectively. In some implementations, the relation/dependency type may further define a particular order/sequence in which the failover/switchover from active server to standby server in each protection unit may need to be performed. In one implementation, configuration information 420 may include/define one or more properties as shown in FIG. 5, for example. FIG. 5 depicts properties that may define scenario dependencies (e.g., relation/dependencies for FileServer 2 scenario and Exchange scenario), group switchover or switchover together relation/dependency type for the FileServer 2 scenario and the Exchange scenario, and/or other properties. It will be understood that the FileServer 2 and Exchange scenarios depicted in FIG. 5 are mere examples of scenarios associated with active server 120a/standby server 120b pair and active server 121a/standby server 121b pair respectively. Other scenarios may exist depending on the type of distributed application being protected by the HA system without departing from the scope of the invention.

In one implementation, the set of one or more management operations 440 that are to be performed by the management object 400 to manage the plurality of scenarios and to ensure continuous system/application operability, may be determined based on the management object configuration information. For example, in case a "failover/switchover together" relation has been defined between scenarios associated with active server 120a/standby server 120b pair and active server 121a/standby server 121b pair, management object 400 may manage and coordinate the failover/switchover of the two pairs. In case a sequence for the switchover has been defined (for example, active server 120a/standby server 120b pair is switched over first and then the active server 121a/standby server 121b pair), management object 400 may coordinate the switchover in that sequence.

Figure 4B:
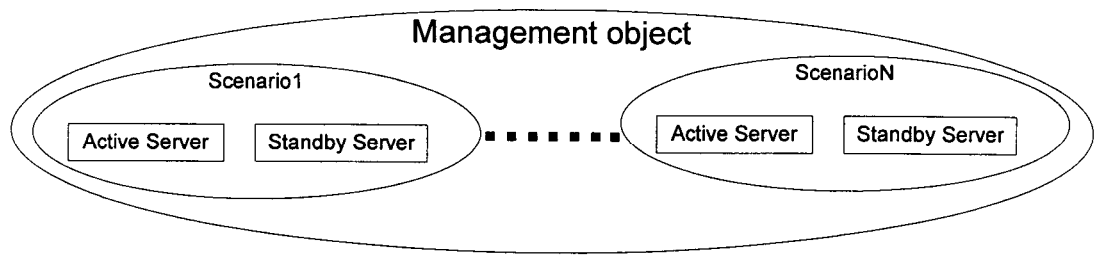

Management object 400 may provide a framework for managing multiple scenarios associated with a distributed application, as depicted in FIG. 4b, for example. Relevant scenarios may be logically grouped together and a user may manage all scenarios together by controlling the management object, thereby making user management easy and greatly reducing management cost. The management object implements the coordination of relationship among the scenarios without having to change the scenario objects' logic. Because the management object is independent for all scenarios, the relationship among these scenarios may be dynamically adjusted (by a user) whether or not the scenario objects are running.

In one implementation, a new active server may be added into HA system 100 to improve server performance, for example. To protect the new active server, a new standby server may be added and a new scenario may be defined for the new protection unit. The new scenario may be easily inserted into the management object configuration information. During the whole process, scenario objects do not need to change any logic (whether or not these scenario objects are running) and only management object configuration information needs to be published to all other management objects in the HA system.

Figure 6:
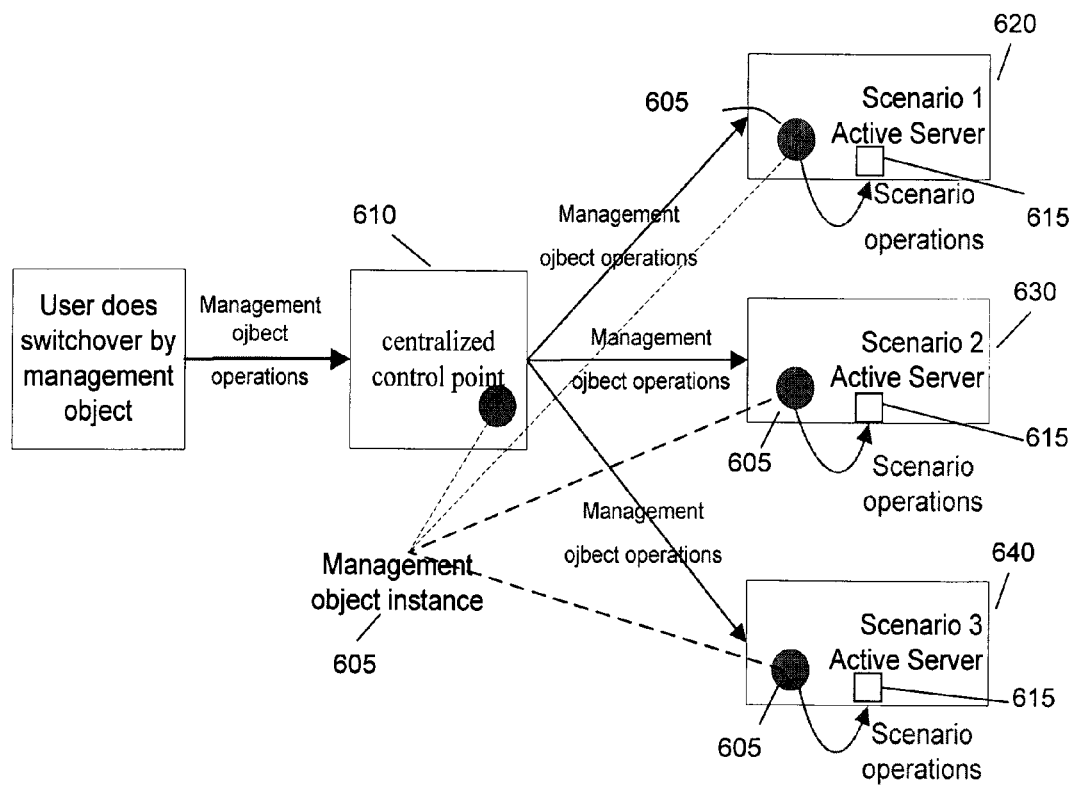
FIG. 6 depicts exemplary centralized management of a plurality of scenarios by a management object, according to various aspects of the invention.

In some implementations, the plurality of scenarios may be managed centrally or in a distributed fashion. FIG. 6 depicts centralized management of a plurality of scenarios by a management object. Management object instances 605 (of management object 400, for example) may reside and run on a centralized control point (CCP) 610 and active servers 620, 630, and 640 associated with three scenarios (scenario 1, scenario 2, and scenario 3). Management object instances may also reside on standby servers associated with the three scenarios; however, they are not depicted in FIG. 6 because they may not receive management object operations to be performed directly from the management object instance on the centralized control point 610. In one implementation, centralized control point 610 may include a server that is separate from the active servers and standby servers. In one implementation, one of the active servers or standby servers may serve as the centralized control point 610. Active servers 620, 630, and 640 may also run scenario object instances 615. Scenario object instances residing on standby servers are not depicted in FIG. 6. In the centralized management case, every scenario which protects a server in a distributed application may take action/perform operations according to management object configuration information.

In one implementation, management object instance 605 associated with CCP 610 may receive one or more commands (for example, user or other commands) to perform one or more operations (for example, failover, switchover, run, stop, and/or other operations) associated with one or more protection units in an HA system. Management object instance 605 associated with CCP 610 may access management object configuration information associated with the instance 605 to determine one or more relationships between one or more scenarios defined for the one or more protection units. Based on the determined relationships, management object instance 605 associated with CCP 610 may determine and/or coordinate the one or more operations performed/to be performed at the protection units. Management object instance 605 associated with CCP 610 may send one or more management object operations/commands (for example, failover, switchover, run, stop, and/or other operations) to one or more management object instances 605 associated with one or more active servers 620, 630, 640. Every management object operation/command may have a corresponding scenario operation/command. For example, a management object switchover operation/command may have a corresponding scenario switchover operation/command. The management object instances 605 associated with the active servers 620, 630, and 640 may send the scenario operations/commands corresponding to the management object operations/commands to the corresponding scenario objects 615. The scenario objects 615 may accordingly perform the scenario operations.

In one implementation, a user may trigger a switchover operation in the case of planned downtime via a GUI. The switchover operation may indicate the protection units and/or scenarios for which the switchover operation has been triggered. Management object instance 605 associated with CCP 610 may receive a notification of the switchover operation.

Management object instance 605 may send a management object switchover operation/command to one or more management object instances 605 associated with one or more active servers 620, 630, 640 based on the management object configuration information. For example, the switchover operation received by management object instance 605 of CCP 610 may indicate that a switchover from active server 620 to the corresponding standby server associated with scenario 1 is to be performed. Management object instance 605 of CCP 610 may access the management object configuration information associated with the management object instance 605 to determine the relation/dependency between scenario 1 and scenarios 2 and 3. Management object instance 605 of CCP 610 may also determine the relation type. Based on the determined relation/dependency and/or relation type information, management object instance 605 of CCP 610 may send one or more management object switchover operations/commands to one or more management object instances 605 associated with one or more active servers 620, 630, 640. For example, it may be determined that scenarios 2 and 3 depend on scenario 1, and that they have a "failover/switchover together" relation. In this case, management object instance 605 of CCP 610 may determine that management object switchover operations/commands need to be sent, and may send the management object switchover operations/commands to all the management object instances 605 associated with the active servers 620, 630, and 640. In response to the received management object switchover operations/commands, the management object instances 605 associated with the active servers 620, 630, and 640 may notify corresponding scenario objects 615 associated with the active servers 620, 630, and 640 respectively regarding the switchover operations/commands. Every management object operation/command may have a corresponding scenario operation/command. The management object instances 605 associated with the active servers 620, 630, and 640 may send the scenario operations/commands corresponding to the management object switchover operations/commands to the corresponding scenario objects 615. The scenario objects 615 may accordingly perform the switchover operations to enable switchover from active servers 620, 630 and 640 to the corresponding standby servers (not shown).

Management and scenario objects have their own responsibilities. A management object may coordinate all scenario objects and the scenario objects may accordingly finish switchover. Without the management object, a user may trigger switchover via scenario objects in servers 620, 630, and 640. For three scenarios, the user may need to separately manage and trigger switchovers separately for the three servers via the respective scenario objects. However, with the management object, a user may trigger a switchover via the management object instance 605 associated with CCP 610. This management object instance may then notify other management object instances 605 associated with servers 620/630/640. Every management object instance in servers 620/630/640 may trigger a switchover via scenario objects 615 associated with servers 620/630/640.

Figure 7:
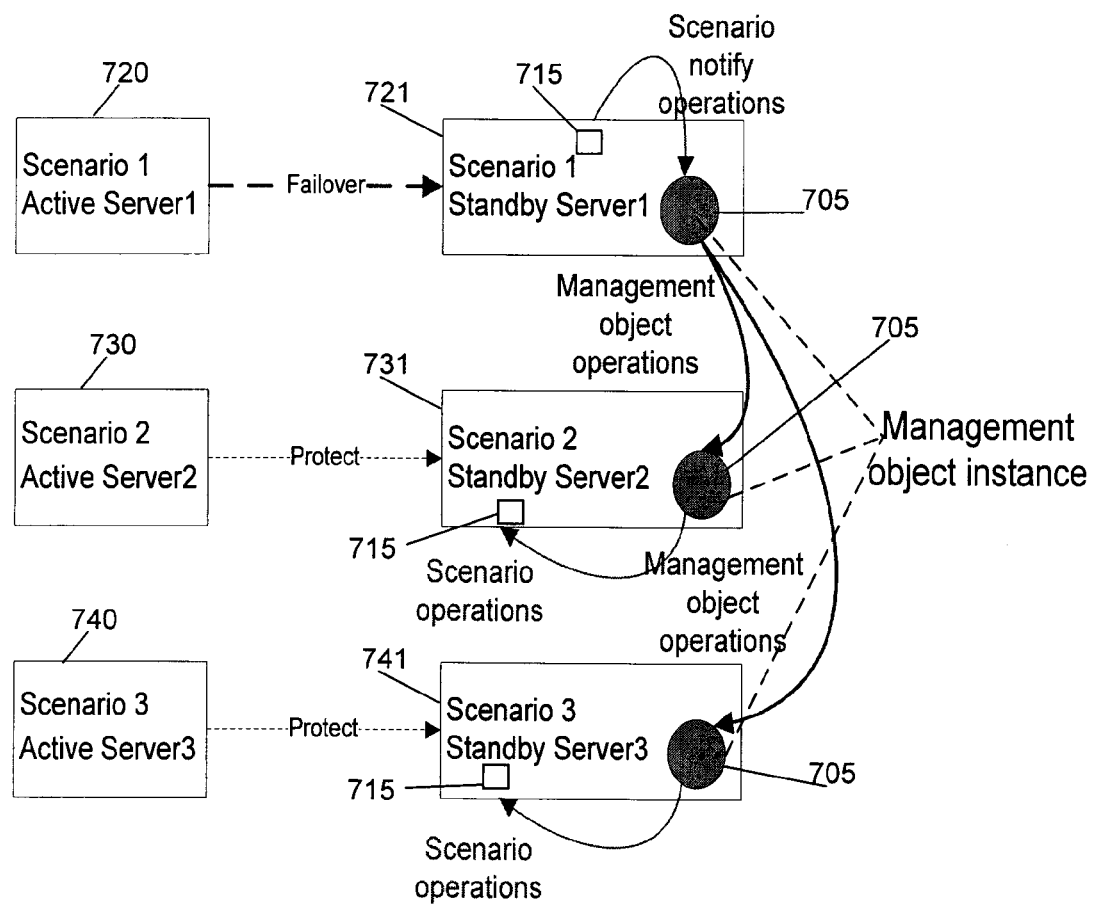
FIG. 7 depicts exemplary distributed management of a plurality of scenarios by a management object, according to various aspects of the invention.

FIG. 7 depicts distributed management of a plurality of scenarios by a management object. Management object instances 705 (of management object 400, for example) may reside and run on standby servers 721, 731, and 741 associated with three scenarios (scenario 1, scenario 2, and scenario 3). Management object instances may also reside on active servers 720, 730, and 740 associated with the three scenarios; however, they are not depicted in FIG. 7 because they may not receive management object operations to be performed directly from the management object instances on the standby servers. Standby servers 721, 731, and 741 may also run scenario object instances 715. Scenario object instances residing on active servers 720, 730, and 740 are not depicted in FIG. 7.

In one implementation, when an active server 720 is unavailable in the case of unplanned downtime, automatic failover from active server 720 to standby server 721 may be performed. Standby server 721 may request active server 720 to detect if agent/scenario object associated with active server 720 is available. If standby server 721 cannot access active server 720 or active server 720 indicates that agent/scenario object associated with active server 720 is unavailable, standby server 721 may trigger a failover operation. Scenario object 715 associated with standby server 721 may perform the one or more failover operations to enable failover from active server 720 to standby server 721. Scenario object 715 associated with standby server 721 may notify management object instance 705 of standby server 721 regarding the failover operation. Management object instance 705 of standby server 721 may access the management object configuration information associated with the management object instance 705 to determine the relation/dependency between scenario 1 and scenarios 2 and 3. Management object instance 705 of standby server 721 may also determine the relation type. Based on the determined relation/dependency and/or relation type information, management object instance 705 of standby server 721 may determine one or more failover operations performed/to be performed at the protection units 730,731 and 740,741 and/or coordinate the one or more failover operations with failover of protection unit 720, 721. Management object instance 705 of standby server 721 may send one or more management object failover operations/commands to one or more management object instances 705 associated with one or more standby servers 731, 741. For example, it may be determined that scenarios 2 and 3 depend on scenario 1, and that they have a "failover/switchover together" relation. In this case, management object instance 705 of standby server 721 may determine that management object failover operations/commands need to be sent, and may send the management object failover operations/commands to the management object instances 705 associated with the standby servers 731 and 741. In response to the received management object failover operations/commands, the management object instances 705 associated with the standby servers 731 and 741 may notify corresponding scenario objects 715 associated with the standby servers 731 and 741 respectively regarding the failover operations/commands. Every management object operation/command may have a corresponding scenario operation/command. The management object instances 705 associated with the standby servers 731 and 741 may send the scenario operations/commands corresponding to the management object switchover operations/commands to the corresponding scenario objects 715. The scenario objects 715 may accordingly perform the failover operations to enable failover from active servers 730 and 740 to the corresponding standby servers 731 and 741. As such, in this case the management object instance 705 of standby server 721 may perform the function of a centralized control point and may manage all the scenarios.

Management object instance 705 at standby server 721 may judge when and how to notify scenario objects to perform failover. Scenario objects at active servers 720, 730, 740 may release a network resource and stop service. Scenario objects at standby servers 721, 731, 741 may gain the network resource and activate the service.

Implementations of the invention may be made in hardware, firmware, software, or various combinations thereof.

The invention may also be implemented as computer-readable instructions stored on a tangible computer-readable storage medium which may be read and executed by one or more processors. A computer-readable storage medium may include various mechanisms for storing information in a form readable by a computing device. For example, a tangible computer-readable storage medium may include optical storage media, flash memory devices, and/or other storage mediums. Further, firmware, software, routines, or instructions may be described in the above disclosure in terms of specific exemplary aspects and implementations of the invention and performing certain actions. However, it will be apparent that such descriptions are merely for convenience, and that such actions may in fact result from computing devices, processors, controllers, or other devices executing firmware, software, routines or instructions.

Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A computer-implemented method for providing high availability for a distributed application distributed across a plurality of protection units, each protection unit being described by a scenario and including at least one active server and at least one standby server, the method executed by one or more processors configured to perform a plurality of operations, the operations comprising:
   receiving an indication that a transfer from a first active server to a first standby server of a first protection unit of the distributed application has or will occur, the first protection unit executing at least a first portion of the distributed application, wherein the first protection unit comprises the first active server and the first standby server;
   determining a relationship between a first scenario that describes the first protection unit and a second scenario that describes a second protection unit of the distributed application, the second protection unit executing at least a second portion of the distributed application, and wherein the second protection unit comprises a second active server and a second standby server; and
   coordinating one or more operations to be performed at the first protection unit and the second protection unit based on the relationship and the indication of the transfer, wherein said coordinating comprises performing a first transfer from the first active server to the first standby server of the first protection unit and performing a second transfer from the second active server to the second standby server of the second protection unit.

2. The computer-implemented method of claim 1, wherein the one or more operations include one or more of a failover operation, a switchover operation, a run operation and a stop operation.

3. The computer-implemented method of claim 1, wherein said determining a relationship further comprises:
   determining a relation type associated with the relationship between the first and second scenarios, wherein the relation type includes a failover together relation indicating that the first active server and the second active server failover together to the first standby server and the second standby server, respectively, a switchover together relation indicating that the first active server and the second active server switchover together to the first standby server and the second standby server, respectively, a run together relation indicating that the first active server and the second active server run together with the first standby server and the second standby server, respectively, or a stop together relation indicating that the first active server and the second active server stop together with the first standby server and the second standby server, respectively.

4. The computer-implemented method of claim 1, the operations further comprising:
   sending one or more management operations to one or more management object instances associated with the first and second protection units, wherein the one or more management object instances send one or more scenario operations to one or more scenario object instances associated with the first and second protection units.

5. The computer-implemented method of claim 1, wherein information regarding the relationship is defined by a user.

6. The computer-implemented method of claim 1, wherein said coordinating one or more operations is performed by a management object instance associated with a centralized control point communicably coupled to the first protection unit and the second protection unit.

7. The computer-implemented method of claim 1, wherein the relationship includes dependency information between the first scenario and the second scenario, the one or more operations being coordinated based at least in part on the dependency information.

8. A non-transitory computer-readable storage medium having one or more computer-readable instructions thereon which when executed by one or more processors cause the one or more processors to:
   receive an indication that a transfer from a first active server to a first standby server of a first protection unit of a distributed application has or will occur, the first protection unit executing at least a first portion of the distributed application, the distributed application distributed across at least the first protection unit and a second protection unit, wherein the first protection unit comprises the first active server and the first standby server;
   determine a relationship between a first scenario that describes the first protection unit and a second scenario that describes the second protection unit of the distributed application, the second protection unit executing at least a second portion of the distributed application, and wherein the second protection unit comprises a second active server and a second standby server; and
   coordinate one or more operations to be performed at the first protection unit and the second protection unit based on the relationship and the indication of the transfer, wherein said instructions causing the processors to coordinate further cause the processors to perform a first transfer from the first active server to the first standby server of the first protection unit and perform a second transfer from the second active server to the second standby server of the second protection unit.

9. The non-transitory computer-readable storage medium of claim 8, wherein the one or more operations include one or more of a failover operation, a switchover operation, a run operation and a stop operation.

10. The non-transitory computer-readable storage medium of claim 8, wherein the one or more computer-readable instructions causing the one or more processors to determine a relationship further include instructions causing the one or more processors to:
   determine a relation type associated with the relationship between the first and second scenarios, wherein the relation type includes a failover together relation indicating that the first active server and the second active server failover together to the first standby server and the second standby server, respectively, a switchover together relation indicating that the first active server and the second active server switchover together to the first standby server and the second standby server, respectively, a run together relation indicating that the first active server and the second active server run together with the first standby server and the second standby server, respectively, or a stop together relation indicating that the first active server and the second active server stop together with the first standby server and the second standby server, respectively.

11. The non-transitory computer-readable storage medium of claim 8, wherein the one or more computer-readable instructions further include instructions causing the one or more processors to:
send one or more management operations to one or more management object instances associated with the first and second protection units, wherein the one or more management object instances send one or more scenario operations to one or more scenario object instances associated with the first and second protection units.

12. The non-transitory computer-readable storage medium of claim 8, wherein the relationship includes dependency information between the first scenario and the second scenario, the one or more operations being coordinated based at least in part on the dependency information.

13. A computer-implemented system for providing high availability for a distributed application distributed across a plurality of protection units, each protection unit being described by a scenario and including at least one active server and at least one standby server, the system comprising:
one or more processors configured to:
receive an indication that a transfer from a first active server to a first standby server of a first protection unit of the distributed application has or will occur, the first protection unit executing at least a first portion of the distributed application, wherein the first protection unit comprises the first active server and the first standby server;
determine a relationship between a first scenario that describes the first protection unit and a second scenario that describes a second protection unit of the distributed application, the second protection unit executing at least a second portion of the distributed application, and wherein the second protection unit comprises a second active server and a second standby server; and
coordinate one or more operations to be performed at the first protection unit and the second protection unit based on the relationship and the indication of the transfer, wherein the processors configured to coordinate are further configured to perform a first transfer from the first active server to the first standby server of the first protection unit and perform a second transfer from the second active server to the second standby server of the second protection unit.

14. The computer-implemented system of claim 13, wherein the one or more operations include one or more of a failover operation, a switchover operation, a run operation and a stop operation.

15. The computer-implemented system of claim 13, wherein the one or more processors configured to determine a relationship further comprise one or more processors configured to:
determine a relation type associated with the relationship between the first and second scenarios, wherein the relation type includes a failover together relation indicating that the first active server and the second active server failover together to the first standby server and the second standby server, respectively, a switchover together relation indicating that the first active server and the second active server switchover together to the first standby server and the second standby server, respectively, a run together relation indicating that the first active server and the second active server run together with the first standby server and the second standby server, respectively, and or a stop together relation indicating that the first active server and the second active server stop together with the first standby server and the second standby server, respectively.

16. The computer-implemented system of claim 13, wherein the one or more processors are further configured to:
send one or more management operations to one or more management object instances associated with the first and second protection units, wherein the one or more management object instances send one or more scenario operations to one or more scenario object instances associated with the first and second protection units.

17. The computer-implemented system of claim 13, wherein the relationship includes dependency information between the first scenario and the second scenario, the one or more operations being coordinated based at least in part on the dependency information.

18. The computer-implemented method of claim 1, wherein the relationship includes a particular sequence in which the first transfer and the second transfer are to be performed, and wherein said coordinating further comprising:
performing the first transfer and the second transfer according to the particular sequence.

19. The non-transitory computer-readable storage medium of claim 8, wherein the relationship includes a particular sequence in which the first transfer and the second transfer are to be performed, and wherein said instructions causing the processors to coordinate further cause the processors to:
perform the first transfer and the second transfer according to the particular sequence.

20. The computer-implemented system of claim 13, wherein the relationship includes a particular sequence in which the first transfer and the second transfer are to be performed, and wherein the processors configured to coordinate are further configured to:
perform the first transfer and the second transfer according to the particular sequence.

* * * * *